Jan. 9, 1962
F. S. ENTZ
3,016,426
MULTIPARTY SELECTIVE SIGNALING SYSTEM
Filed Oct. 4, 1957
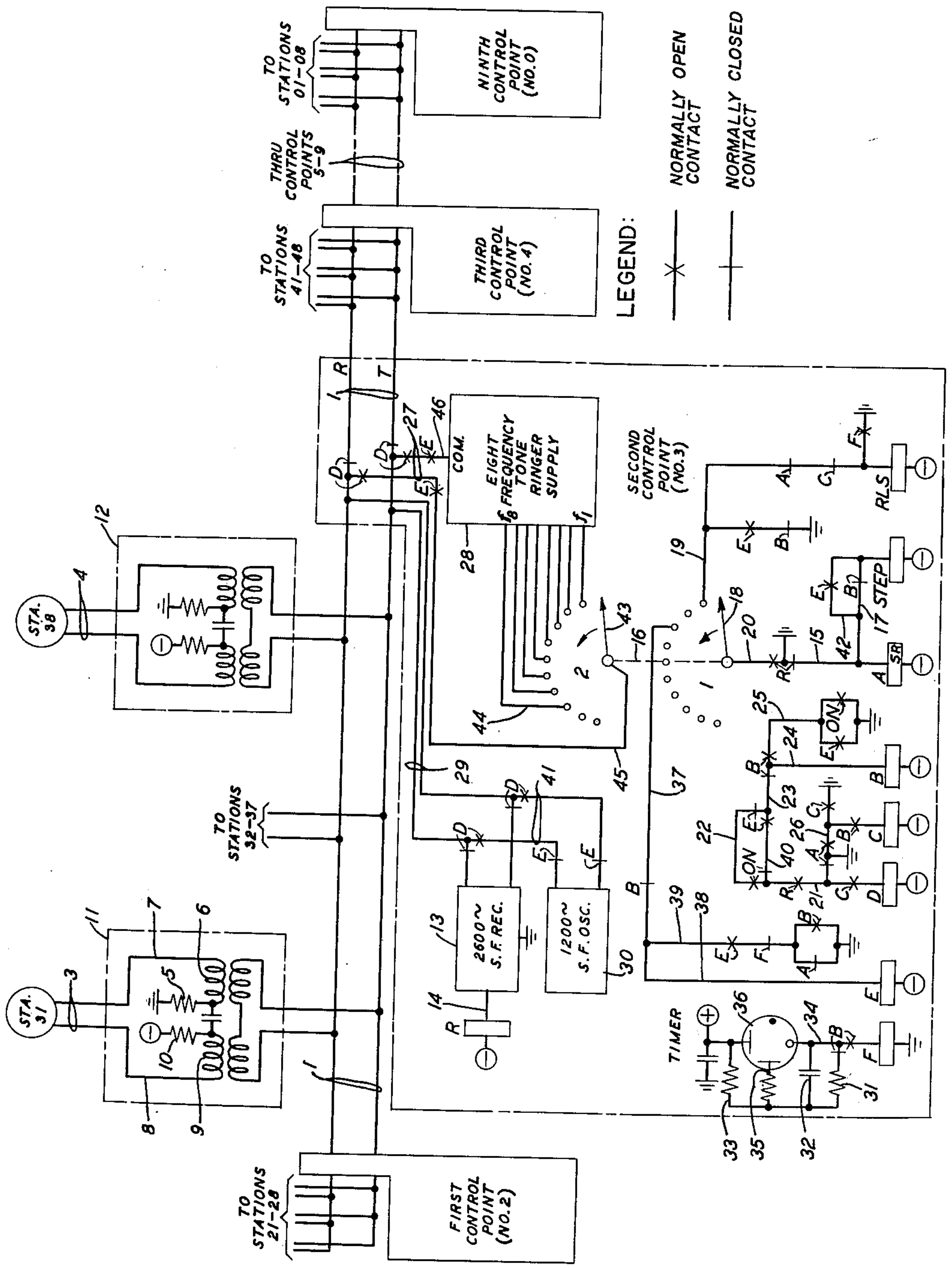
INVENTOR
F. S. ENTZ
BY A. M. Hassell
ATTORNEY United States Patent Office 3,016,426

Patented Jan. 9, 1962

3,016,426
MULTIPARTY SELECTIVE SIGNALING SYSTEM

Ferdinand S. Entz, Hartsdale, N.Y., assignor to Bell Telephone Laboratories, Incorporated, New York, N.Y., a corporation of New York Filed Oct. 4, 1957, Ser. No. 688,367
10 Claims. (Cl. 179—84)

This invention relates to communication systems and, more particularly, to common-line communication systems wherein any one of a plurality of stations connected to the line can selectively call any other station which is connected to the line.

Common-line communication systems heretofore proposed have provided a selective-calling feature by having at each station a unique element of apparatus which is responsive to a correspondingly unique signal. In such systems all stations on the line are provided with apparatus which causes a unique signal corresponding to the station called to be applied to the line.

One embodiment of such a system provides at each station a dial for interrupting the line and a step-by-step selector switch arranged to initiate ringing at the station upon the receipt of a predetermined series of dial pulses. Such a system may be disadvantageous where a large number of stations are desired because of the high cost of the selector switches and their need for field maintenance.

Another embodiment of such a common line system provides at each station a device for causing a plurality of distinct frequency tones to be selectively applied to the line and a ringer unit responsive to only one of such tones. Mechanical reeds and oscillators have variously been used to produce such tones and corresponding reeds or tuned circuits have been utilized in the ringer units. Because of the nature of telephone line transmission characteristics, it is only practicable to utilize tones which fall within the voice-frequency range. Beyond this range signal attenuation becomes excessive. Further, cost considerations relative to the construction of discriminating filter networks and interference caused by tone harmonics require that an appreciable separation exist between each of such tones. Consequently only a limited number of such unique tones are practically available for use in such a system. The number of stations which can be connected to any one line is correspondingly limited. However, in general, such systems are of reasonable cost and require little if any field maintenance at each station. Consequently certain embodiments thereof have been adapted to rural multi-station service and are readily available.

One general object, therefore, of the present invention is to develop a system having the best features of these aforementioned embodiments, thereby providing an economical selective calling system capable of serving an unlimited number of stations.

Accordingly, in accordance with one feature of the invention a plurality of sections, each comprising a multi-station selective ringing telephone line, are connected in tandem through normally closed line sectionalizing relays which briefly interrupt the line during ringing intervals in order that the called station may be signaled in a substantially conventional manner without initiating ringing at any other station on the line.

In accordance with another feature of the invention a predetermined number of stations are connected to each of the sections of the line. The ringers at each of these stations are arranged to respond to a different tone, and the tone assignments are repeated in each successive section, thereby permitting all sections to be supplied with an identical set of ringers.

In accordance with yet another feature of the invention control points, each associated with one of the aforementioned line-sectionalizing relays, are arranged to briefly operate their associated line-sectionalizing relays at the completion of dialing.

In accordance with still another feature of the invention the aforementioned control points are each further arranged to apply to the line during the period the line is sectionalized either a tone corresponding to the called station or a guard tone depending upon whether or not such station is connected to the line section with which the control point is associated.

Briefly, in one specific embodiment, the instant selective calling system comprises a single telephone line which is divided into nine sections. The digits 2, 3–9 and 0 are assigned to each of the sections, respectively. Eight stations or telephone sets are connected to each of these sections. The digits 1–8 are assigned to each of these eight stations, respectively. Accordingly, each of the seventy-two possible stations on the line possesses a unique directory number or calling code consisting of the digit representing the section on which it is located and the digit representing its position among the eight stations on its section.

The eight telephone sets on any particular section are each equipped with an oscillator under the control of the dial for producing pulses of 2600-cycle current and a tone ringer which is responsive to a different tone than that to which every other subset on the section is responsive. The telephone sets on the remaining sections have identical dials and are each responsive to one of the same eight tones. Associated with each section is a control point which includes a set of normally-closed contacts joining that section to the next. A talking path is therefore normally available between any two stations even though located on different sections of the line. Of course, a talking path is always available between any two stations on the same section.

Signaling between any two stations on the line is initiated at the originating station by dialing the two-digit calling code assigned to the called station. As soon as the second digit is dialed all control points operate their sectionalizing relays and the line is broken into sections. The control point associated with the section on which the called station is located then applies to the line the tone to which the called station is responsive. Thus if station 38 were called, the second control point would apply No. 8 tone to the line. It should be recalled that the digit "1" is not assigned to any section and that accordingly stations 21–28 are connected to the first section, stations 31–38 to the second section, and so on. The applied tone actuates the ringer mechanism in station 38, but is ineffective to actuate the ringers in stations 28 and 48 . . . 08 because the common line is open between the tone source on the second section and the remaining sections. After the completion of a timed ring, the tone is removed from the line and all sectionalizing relays release, restoring line continuity. If the called party has answered, the conversation may commence over the normally closed path. If there has been no answer, the calling party must redial in order to initiate another ring.

Other objects and features will be apparent from and the following detailed description will be more clearly understood in connection with the single FIGURE of the drawing which is a schematic diagram of one embodiment of the invention.

To afford a better understanding of the figure, the switching symbols pictured in the legend are defined as follows: A "normally closed contact" is a relay actuated armature which permits the flow of current only when the winding of the relay actuating the armature in question is de-energized. A "normally open contact" is a relay actuated armature which permits the flow of current only when the winding of the relay actuating the armature in question is energized.

Referring now to the figure, the second of the nine sections comprising common telephone line 1 is shown in detail. The remaining eight sections of the line are each similar to the second section and have not, therefore, been shown in detail. Each station, such as No. 31, may include a conventional oscillator (not shown) under control of a dial (not shown) for producing a 2600-cycle signal. The oscillator and dial are serially connected to local loop 3. The output of the oscillator is interrupted by the operation of the dial in a manner which is analogous to the interruption of a direct current in a conventional telephone set. In addition, each station may include a ringing unit which is responsive to one of the following eight tones in the voice-frequency band: 478, 532, 591, 656, 729, 810, 900, and 1000 cycles. Such a ringing unit is more fully disclosed in copending application, Serial No. 574,718, filed March 29, 1956, by J. R. Power, now U.S. Patent 2,873,316, granted February 10, 1959, for a Party Line Lock-Out Circuit, and reference may be made to said copending application for a more detailed description of such ringing unit. The station sets themselves could be selected from among those types currently available for eight-party line full selective ringing on conventional rural telephone circuits. The manner in which the novel arrangement that is hereinafter more fully described could be modified to use any of such available types of selective ringing station sets will be obvious to those skilled in the telephone art.

The aforementioned ringing units and oscillators are provided with centralized energy for their operation through the flow of direct current in the local loops. Current flows from ground through resistor 5, winding 6, tip side 7 of local loop 3, the oscillator and ringer (not shown) of the telephone set at station No. 31, the ring side 8 of local loop 3, winding 9, to resistor 10 and battery. It is contemplated that common line 1 may extend for long distances and that each station might be connected through a different local central office. It is particularly anticipated that all stations will not be connected to the central office which contains the control point for the section of the line 1 to which they are connected. Therefore, in order to reduce the length of the direct-current path required for the supply of the station sets, the apparatus shown in dotted rectangles 11 and 12, which serves to apply the direct-current potential to the local loop while maintaining a "balanced" line, i.e. one in which spurious ground currents will not flow, is located in the local central office which is nearest to the station.

It should be recalled that no control point has been assigned the digit "1." Such an assignment would prevent the control points from distinguishing between a bona fide first digit and stray interruptions on the line. With all first digits comprising two to ten interruptions in a 2600-cycle current, the control points can be arranged to disregard an isolated pulse.

For example, whenever a single random interruption in a 2600-cycle signal appears on line 1, the control point operates as follows. The receiver 13, which may be any device which is suitably arranged to remove ground from conductor 14 for a very brief interval after every interruption in a 2600-cycle signal which appears on line 1, causes ground to be momentarily removed from conductor 14. Relay R releases and in releasing operates slow-release relay A over a path from ground through normally closed contacts R and conductor 15 to the winding of relay A and battery. The stepping relay STEP for selector switch 16 is also operated over a path from ground on conductor 15 through conductor 17 and normally closed contacts B to the winding of relay STEP and battery. The wiper 18 on selector switch 16 advances to the first position, thereby making a connection with conductor 19 and operating off-normal contacts ON. Contacts ON are operated whenever the wipers of selector switch 16 are in any other than their rest position. Relay R reoperates. After the expiration of a time interval equal to an inter-digital period relay A release. Relay B operates and locks over paths which will be described subsequently. Release relay RLS for the selector switch 16 is then operated over a path from ground through normally open contacts R, conductor 20, wiper 18, conductor 19 and normally closed contacts A and C to the winding of relay RLS and battery. Wiper 18 drops back to its normal position and the control point returns to its unoperated condition. Relay B releases in a manner which will be described subsequently.

When a customer dials a directory number which corresponds to a station which is not connected to the second section, for example, No. 28, the second section partially responds by sectionalizing the line and applying a guard tone. The first of the two interruptions comprising the initial dialed digit "2" results in the release of relay R, the operation of relays A and STEP, the advance of wiper 18 to the first position, and the operation of contacts ON, all as heretofore described for the case of the random interruption. The wiper does not drop back as before, however, because the second of the two interruptions comprising the digit "2" arrives before the expiration of the interdigital period required for the release of relay A and causes relay R to release once more, thereby reenergizing the winding of relay A. Ground is removed from conductor 20 and reconnected to conductor 15. Relay STEP operates and wiper 18 advances to the second position.

It should be recalled that relay R reoperates rapidly after the end of a 2600-cycle interruption. Conductor 15 in the winding circuit of relay A is therefore promptly disconnected from ground. Relay A releases after the expiration of an interdigital period. Relay B then operates over a path from ground through normally closed contacts A, conductor 21, normally open contacts R and ON, conductor 22, normally closed contacts E, conductor 23, normally closed transfer contacts B and conductor 24 to the winding of relay B and battery. Relay B operates and locks over a path from ground through normally open contacts ON, conductor 25, normally open transfer contacts B and conductor 24 to the winding of relay B and battery.

The operation of relay B opens the path through conductor 17 to the winding of relay STEP. Thus when the eight interruptions which comprise the digit "8" in the dialed code "28" arrive, the selector 16 fails to respond. The release of relay R, in response to the initial interruption of the dialed digit "8," results in the reoperation of relay A through a previously-described path. The reoperation of relay A results in the operation of relay C over a path from ground through normally open contacts A, conductor 26 and normally open contacts B to the winding of relay C and battery. Relay C operates and locks over an obvious path through normally open contacts B and C.

Seven more pulses are received after which relay A releases an interdigital period after the arrival of the eighth pulse. Relay D then operates over a path from ground through normally closed contacts A, conductor 21 and normally open contacts C to the winding of relay D and battery.

Relay D, the line-sectionalizing relay, opens line 1 and connects leads 27 from the eight-frequency tone ringing supply 28 to the line section. Tone fails to reach the section, however, since contacts E in conductors 27 are open. The operation or relay D transfers conductors 29 from the single frequency receiver 13 to a 1200-cycle single frequency oscillator 30 through normally closed contacts E. This oscillator applies guard tone to the line section for warning customers that the common line is open and that ringing is in progress somewhere along the common line.

The operation of relay B, heretofore described, initiates the operation of the timer by removing a shunt 31 from around timing capacitor 32. The capacitor charges over a path from positive battery through conductor 33, capacitor 32, conductor 34 and normally open contacts B to the winding of relay F and ground. The charging current for the capacitor is too small to operate relay F. When the charge on capacitor 32 reaches a predetermined value, after about four seconds, for example, the voltage on control anode 35 rises sufficiently to cause gas tube 36 to break down and provide a low resistance path for the operation of releasing relay F.

The operation of relay F completes an obvious path for the operation of relay RLS. The selector switch drops back from the second position to its normal position, releasing contacts ON. The release of contacts ON interrupts the locking circuit for relay B and that relay releases. Relays C and D release in that order, restoring the continuity of line 1, removing guard tone, and reconnecting the receiver 13 to the line. The release of relay B also discharges capacitor 32 through shunting resistor 31 and relay F, thereby releasing relay F and recycling the timer. The release of relay F interrupts the operating circuit for relay RLS and the later relay releases. The control point then stands in its unoperated condition.

When a customer dials a calling code which corresponds to a station connected to the second section, for example, No. 38, the following operations take place in the control point. The arrival at receiver 13 of the train of three interruptions comprising the initial digit "3" results in the pulsing of relay R and the operation of relays A and STEP in the manner hereinbefore described. The three operations of relay STEP operate contacts ON and advance wiper 18 of selector switch 16 to the third position where contact is made with conductor 37. Relay E operates over a path from ground through normally open contacts R, conductor 20, wiper 18, conductor 37, normally closed contacts B and conductor 38 to the winding of relay E and battery.

It should be noted that in the third control point conductor 37 would be connected to the fourth position on selector switch 16, in the fourth control point to the fifth position, and so on. The control points may be otherwise identical.

At the expiration of an interdigital period after the arrival of the last interruption comprising the initial digit, relay A releases, locking relay E over a path from ground through normally closed contacts A and F, normally open contacts E and conductors 39 and 38 to the winding of relay E and battery. Relay B is not operated in response to the release of relay A because the operation of relay E opened the normally-closed contacts in conductor 22. The operation of relay E disconnects the output of guard-tone oscillator 30 from conductors 41 and connects the output of tone-ringing supply 28 to conductors 27. Relay RLS is energized over a path from ground through normally closed contacts B, normally open contacts E, conductor 19 and normally closed contacts A and C to the winding of relay RLS and battery. The wiper 18 of selector switch 16 drops back to its normal position and contacts ON release. Relay B is operated over a path from ground through normally closed contacts A, conductor 21, normally open contacts R, normally closed contacts ON, conductor 40, normally open contacts E, conductor 23, normally closed transfer contacts B and conductor 24, to the winding of relay B and battery. Relay B locks over a path from ground through normally open contacts E, conductor 25, normally open transfer contacts B and conductor 24 to the winding of relay B and battery. The operation of relay B initiates the timer by removing resistor 31 from in shunt of capacitor 32, releases relay RLS by opening its operating winding circuit, shunts the normally closed contacts A in the holding circuit for relay E, and prepares an operating circuit for relay C.

The eight interruptions which comprise the second dialed digit result in the operation of relays STEP and A in a manner hereinbefore described. The operation of relay A results in the operation of relay C over a previously-described path. As heretofore mentioned, relay A remains operated during the pulse train, but relay STEP follows pulsing relay R and is operated eight times over a path from ground on conductor 15 through conductor 42 and normally open contacts E to the winding of relay STEP and battery. Wiper 18 on stage 1 of selector switch 16, therefore, advances to the eighth position. Stage 2 of switch 16 is mechanically linked to stage 1 and wiper 43 correspondingly advances to the eighth position of stage 2 where 1000-cycle tone is available on conductor 44.

At the expiration of an interdigital period following the arrival of the last interruption comprising the second dialed digit "8," relay A releases, resulting in the operation of line-sectionalizing relay D over a previously-described path. Relay D sectionalizes the common line 1, separating the second section from the third, transfers conductors 29 from receiver 13 to conductors 41, and connects conductors 27 to the second line section. Of course, the concurrent operation of the first control point and its associated line-sectionalizing relay in a manner hereinbefore set forth results in the separation of the first section from the second. The second section is therefore isolated from all other sections. One-thousand-cycle tone passes from tone-ringing supply 28 through conductor 44, wiper 43, conductor 45, normally open contacts E and D, ring side of line 1, local central office 12, local loop 4, ringer of station No. 38 (not shown), local loop 4, local central office 12, tip side of line 1, normally open contacts D and E, to conductor 46 and the common terminal of tone-ringing supply 28. The 1000-cycle tone also passes in a similar manner to the ringers of the remaining stations in the section but they do not respond thereto because they are selectively responsive to tones having frequencies which are less than 1000 cycles. Of course, the stations on other sections do not respond because the line 1 is open between all sections. Ringing continues until capacitor 32 charges to a voltage which fires tube 36 and operates relay F. Relay E is released and relay RLS is operated over an obvious path, releasing switch 16. Relays B, C, D, F and RLS release, restoring line continuity and returning the control point to its unoperated condition as hereinbefore discussed.

While automatic ringing and tripping, as provided in multi-party line applications, could be readily provided in connection with the disclosed specific embodiment, it has been omitted in the present embodiment in the interest of simplicity and economy. In the event the calling party desires to actuate the called party's ringer a second or subsequent time, the calling party is required to redial the called party's directory number following the removal of 1200-cycle guard tone from the line.

The invention has been described above with reference to a particular embodiment thereof utilizing line sections comprising multi-party full selective ringing telephone lines of a specific type. It will be evident, however, to one skilled in the art that said invention is limited to neither the particular embodiment nor the particular multi-party lines shown in connection therewith, but that various applications, modifications and arrangements other than those disclosed herein are within the scope of the invention. For example, multifrequency keysets could be used in place of the 2600-cycle dialing arrangement, the number of stations per section could be greater or less than the number shown, time-division ringing could be used instead of frequency-division ringing, and voice frequencies other than the eight set forth above could be employed.

What is claimed is:

1. A communication system comprising a plurality of multistation telephone lines arranged in tandem, a plurality of stations on each of said lines, means responsive to the initiation of a call by each of said stations for briefly isolating each of said lines from the others, and means associated with each of said lines for recording the designation of the station called by said each of said stations, the one of said last-mentioned means associated with the line to which the called station is connected being further effective to signal said called station while said lines are isolated.

2. A communication system comprising a plurality of communication lines each having a plurality of stations connected thereto, each one of said stations being represented by a different one of a plurality of calling codes, means for selectively generating said calling codes, signaling means connected to each line for selectively signaling the stations connected to that line, means normally connecting said lines in tandem, means responsive to the receipt of any one of said calling codes for momentarily disconnecting said lines from each other, and means including said signaling means responsive to said any one of said calling codes for selectively signaling only the station represented by said one of said calling codes while said lines are disconnected.

3. A communication system comprising a plurality of telephone lines connected in tandem, a plurality of stations connected to each of said lines, a plurality of signaling means connected one to each one of said lines, each signaling means being effective when activated to selectively signal the stations on the line to which it is connected, means responsive to the initiation of a call by any one of said stations for briefly disconnecting each of said lines from the remainder of said lines, and means associated with each of said lines for recording the designation of the station called by said any one of said stations and for selectively activating one of said signaling means thereby to signal the called station while said lines are briefly disconnected.

4. In a communication system a common line comprising a plurality of sections, a plurality of stations connected to each section, signaling means associated with each of said sections for generating ringing signals, means responsive to the initiation of a call by any one of said stations for isolating each of said sections from each other of said sections simultaneously, and means further responsive to said initiation of a call for applying ringing signals to only that one of said sections which includes the called station.

5. A communication system comprising a plurality of stations, a common line interconnecting said stations, means responsive to the initiation of a call by a station for briefly segregating said stations into electrically isolated groups simultaneously, signaling means associated with each of said groups for generating ringing signals, and means further responsive to said initiation of a call for applying ringing signals to only that one of said groups which includes the called station.

6. A signaling system comprising a plurality of stations arranged in groups, means at each of said stations for selectively generating a plurality of information-representing signals, indicating means at each of said stations selectively responsive to particular ones of said signals, a common signaling line interconnecting each of said indicating means with each other of said indicating means, means for rendering the indicating means associated with one corresponding station within each group responsive to an identical one of said signals, and means responsive to another of said signals for dividing said line into segments simultaneously, each of said segments being exclusively connected to the stations of a particular one of said groups while said line is divided.

7. A signaling system comprising a plurality of stations arranged in groups, one corresponding station within each group being inherently responsive to an identical one of a first plurality of signals, means at each station for selectively generating a second and a third plurality of signals, said second plurality of signals being severally representative of said groups and said third plurality of signals being severally representative of said first plurality of signals, a common signaling line interconnecting said stations, means at each group responsive to the receipt of one of said second and one of said third signals for disconnecting said group of stations from the remaining groups of stations, and means at each group responsive to the receipt of said one of said second and said one of said third signals when said one of said second signals is the one which represents the group at which said means is located for generating the one of said first plurality of signals which is represented by said one of said third signals thereby to actuate the corresponding one of said stations.

8. A signaling system according to claim 7 wherein said first plurality of signals comprises a plurality of distinct voice-frequency tones.

9. A signaling system according to claim 7 wherein said means at each station for selectively generating a second and third plurality of signals comprises an oscillator under control of a dial for producing pulses of fixed frequency tone.

10. A signaling system according to claim 7 wherein said first plurality of signals comprises a plurality of distinct voice-frequency tones and said means at each station for selectively generating a second and a third plurality of signals comprises an oscillator under control of a dial for producing pulses of fixed frequency tone.

References Cited in the file of this patent

UNITED STATES PATENTS

| | | |
|---|---|---|
| 1,692,907 | Shackleton | Nov. 27, 1928 |
| 2,052,050 | Levy | Aug. 25, 1936 |
| 2,307,855 | Pearce | Jan. 12, 1943 |
| 2,402,446 | Powell | June 18, 1946 |
| 2,691,723 | Nordahl | Oct. 12, 1954 |
| 2,933,560 | Fairbairn | Apr. 19, 1960 |